UNITED STATES PATENT OFFICE.

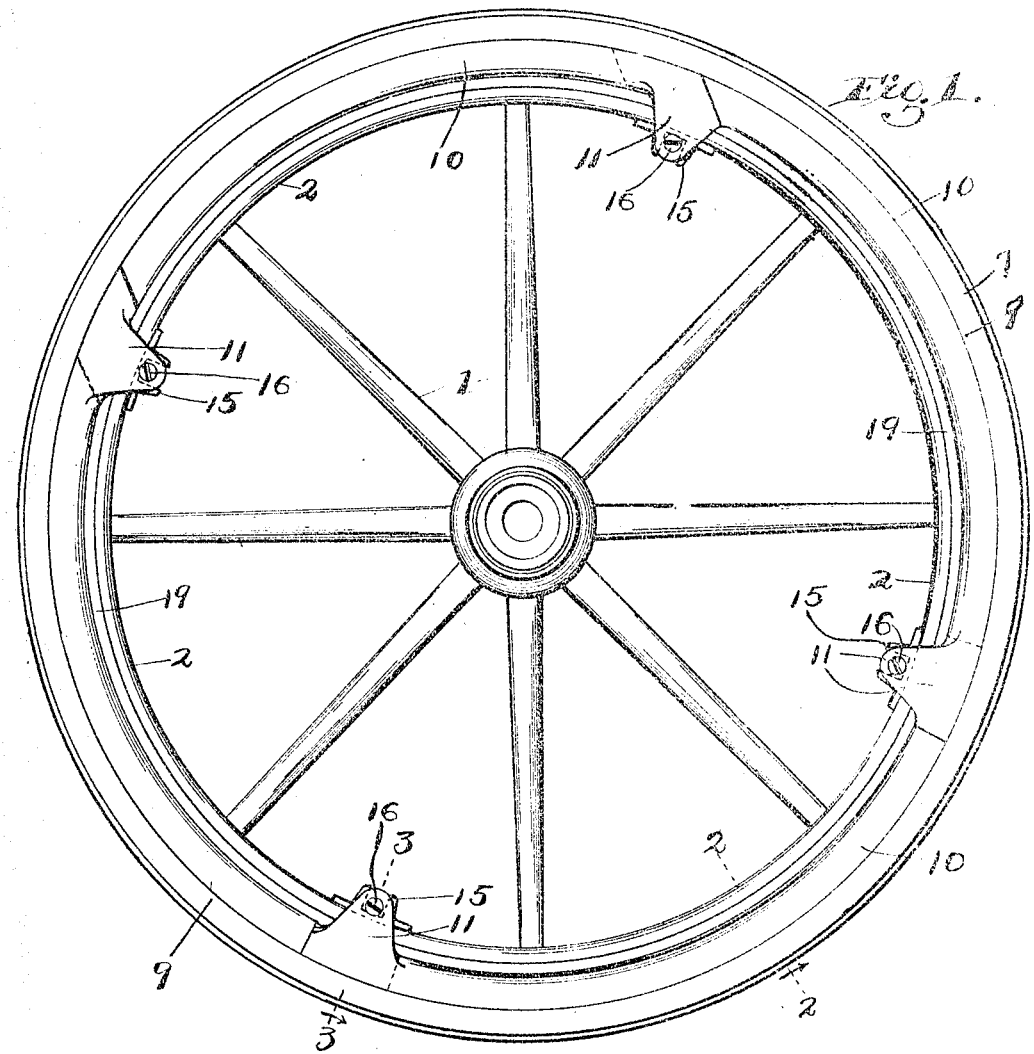

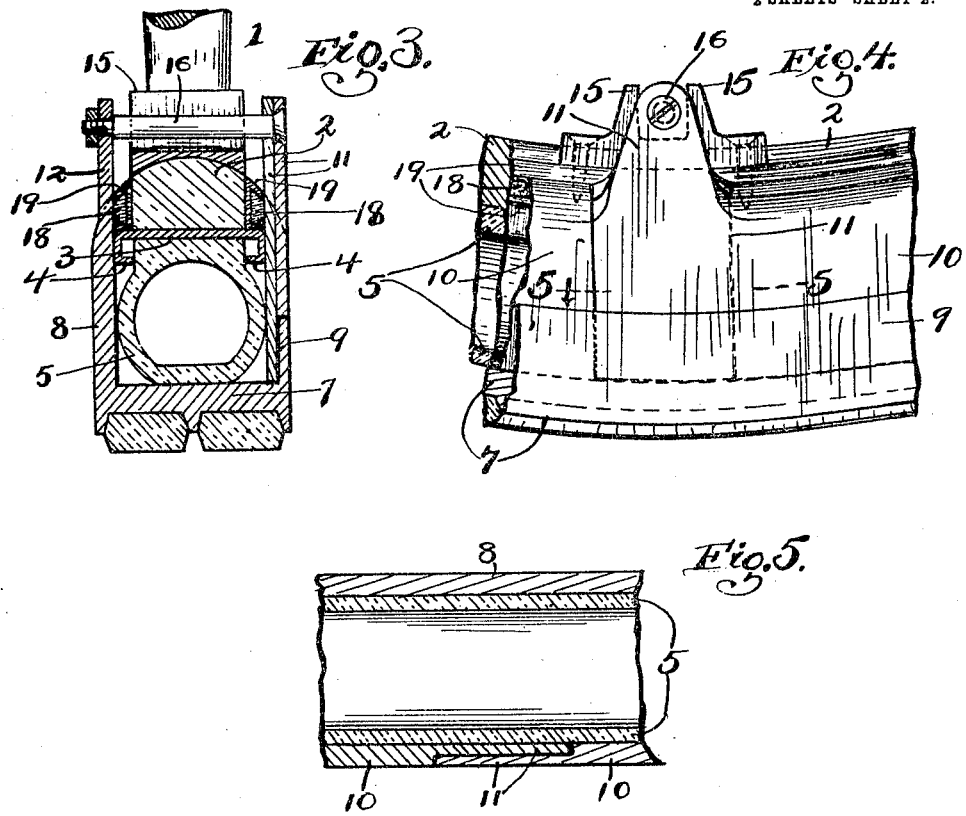

WILLIAM A. HELLER, OF AKRON, OHIO.

TIRE.

No. 871,404.  Specification of Letters Patent.  Patented Nov. 19, 1907.

Application filed February 9, 1907. Serial No. 356,587.

*To all whom it may concern:*

Be it known that I, WILLIAM A. HELLER, a citizen of the United States of America, residing at Akron, in the county of Summit and State of Ohio, have invented certain new and useful Improvements in Tires; and I hereby declare the following to be a full, clear, and exact description of the invention, such as will enable others skilled in the art to which it pertains to make and use the same.

This invention relates to improvements in cushion tires especially adapted for heavy and comparatively slow moving vehicles.

The object of this invention is to provide a tire which will have the strength and durability of a solid tire combined with the flexibility and resiliency of a pneumatic tire.

My invention, therefore, consists in providing, in combination with a wheel a tire comprising a pneumatic tube and a shoe or casing arranged to inclose said tube and independently supported from the wheel so as to be free to move with the movement of the pneumatic tube without detracting from the buoyancy thereof.

My invention also consists in the features of construction and combination of parts as described in the specification, pointed out in the claims and illustrated in the accompanying drawings.

In the accompanying drawings, Figure 1 shows a wheel equipped with a tire embodying my invention. Fig. 2 is a section on line 2—2, Fig. 1. Fig. 3 is a section on line 3—3, Fig. 1. Fig. 4 is an enlarged sectional view of a portion of a tire. Fig. 5 is a section on line 5—5, Fig. 4.

Again referring to the drawings 1 represents the wheel which is provided with the usual rim 2. Around the rim of the wheel is preferably arranged a metallic band 3, which as shown in the drawings is provided with flanges 4 but the flanges may be omitted if desired. An endless tube of rubber 5 or other suitable material adapted to be inflated by air or other means is mounted on the band 3 and constitutes the inner member of my tire. The outer member of my tire comprises a shoe or casing which is preferably formed of metal and is U-shaped in cross section. The casing is arranged to completely inclose the pneumatic tube and the sides thereof lap over the rim of the wheel. This casing consists of an annular plate or tread 7. At one side of the tread is arranged a side plate 8 which is preferably formed integral with the tread 7 and extends up and laps on the rim of the wheel at one side.

On the opposite side of the tread is formed an annular flange 9. The removable side of the casing is formed of a series of independent plates 10, which as shown in the drawings are four in number. Each of these plates 10 has a depth equal to the depth of the opposite side plate 8 and is arranged to fit inside of the flange 9. Each plate 10 is made long enough to overlap the ends of the adjacent plates 10 and on the overlapping end of each plate 10 is formed an ear 11, the ears on the overlapping ends of the plates being arranged to coincide with each other. On the side plate 8 are also formed ears 12 which are arranged to register with gears 11 on the plates 10 when said plates are in their proper position. On the rim of the wheel are formed four pairs of projections or lugs 15 which are spaced the same distance apart as the ears on the side plates of the shoe. Pins 16 are passed through openings formed in the ears on the side plates and between the lugs of each pair of lugs and said lugs of each pair of lugs are so spaced as to permit the pin to have sufficient play to allow for the movement of the shoe or casing corresponding to the compression of the pneumatic tube while at the same time securing the shoe to the rim of the wheel. On each side of the rim of the wheel, where the side plates of the casing overlap the rim, is arranged a packing ring 18 of rubber or any other suitable material. The packing rings 18 are supported in annular frames 19 secured to the rim of the wheel. The object of the packing rings is to prevent dust or other foreign material from entering the casing and injuring the pneumatic tube.

In carrying out my invention it will readily be seen that the construction can be changed to a considerable extent without departing from the spirit of my invention and I do not therefore limit myself to the exact form which I have shown.

What I claim is:—

1. The combination with a wheel of a pneumatic tube arranged on the rim thereof and a casing arranged to inclose said pneumatic tube, said casing comprising a bottom or tread portion, a side portion formed integral therewith, a side portion detachably secured to said tread portion and consisting of a number of independent plates, ears formed on said detachable plates and on the integral side plate, lugs formed on the rim of said wheel and pins passing through said ears and between said lugs, substantially as described and for the purpose set forth.

2. The combination with a wheel of a pneumatic tube arranged on the rim thereof and a casing arranged to inclose said pneumatic tube, said casing comprising a bottom or tread portion, a side portion formed integral at one edge thereof, a flange formed integral at the opposite edge, a detachable side portion arranged to fit within said flange, ears formed on the detachable side portion and on the integral side portion, lugs formed on the rim of said wheel and pins passing through said ears and between said lugs, substantially as described.

In testimony whereof, I sign the foregoing specification, in the presence of two witnesses.

WILLIAM A. HELLER

Witnesses:
L. D. SEWARD,
L. F. HELLER.